United States Patent [19]

Rock

[11] Patent Number: 4,697,186
[45] Date of Patent: Sep. 29, 1987

[54] VELOCITY DISCRIMINATION RADAR

[75] Inventor: Robert G. Rock, Coronado, Calif.

[73] Assignee: The United States of America as represented by the Secretary of the Navy, Washington, D.C.

[21] Appl. No.: 574,169

[22] Filed: Apr. 30, 1975

[51] Int. Cl.[4] ............................................. G01S 13/04
[52] U.S. Cl. .................................... 342/189; 342/108
[58] Field of Search ......... 343/9 (U.S. only), 100 CL; 342/108, 112, 90, 189

[56] References Cited

U.S. PATENT DOCUMENTS

| | | | |
|---|---|---|---|
| 3,140,486 | 7/1964 | Gillmer | 343/8 |
| 3,208,065 | 9/1965 | Gutleber et al. | 343/100 CL |
| 3,337,870 | 8/1967 | Allen et al. | 343/100 CL X |
| 3,374,478 | 3/1968 | Blau | 343/100 CL X |
| 3,518,415 | 6/1970 | Gutleber | 343/100 CL X |
| 3,882,444 | 5/1975 | Robertson | 343/100 CL X |

*Primary Examiner*—T. H. Tubbesing
*Assistant Examiner*—Mark Hellner

*Attorney, Agent, or Firm*—Ervin F. Johnston; John W. McLaren; Harvey Fendelman

[57] ABSTRACT

A radar method and apparatus which utilizes a first frequency signal modulated by a first modulating signal and a second frequency signal modulated by a second modulating signal, the first and second frequencies being different and the first and second modulating waveforms having different periods of repetition. The radar receiver separates the return radar signal into the component due to the first frequency signal and the component due to the second frequency signal. Both components are then heterodyned with their respective frequency signals. Each modulating waveform is subjected to a plurality of delays and each component is subsequently correlated with each of its respective delayed modulating waveforms. A target is recognized when the correlated first frequency component exceeds a predetermined threshold and simultaneously the correlated second frequency component exceeds a predetermined threshold.

15 Claims, 4 Drawing Figures

VELOCITY DISCRIMINATION RADAR

BACKGROUND OF THE INVENTION

Doppler radars of different types have been developed and are extensively used in both civilian and military applications. The usual continuous wave (CW) radar system provides target velocity information but no range information, i.e., the unambiguous range equals zero. A Pseudo-Random modulated CW radar has been developed which has the advantage of increasing the apparent transmitter power and also providing both target velocity and target range information. This modulated CW system has the disadvantage, however, that its unambiguous range is equal to CNT/2, where C is the speed of light, N is the number of bits in the Pseudo-Random modulating sequence and T is the bit time. An example of this type of prior art system will be described below. The prior art system, moreover, is effective only for targets creating small Doppler shifts, since those targets that cause large Doppler frequency shifts result in relatively high frequency sinusoidal inputs to the receiver correlator which severely degrades or makes impossible the correlation process.

SUMMARY OF THE INVENTION

The present invention relates to a novel radar system that provides velocity discrimination, target radial velocity, and large unambiguous ranging capability such greater than CNT/2 and is especially useful in monitoring targets which produce large Doppler frequency shifts. This is accomplished by transmitting a radar signal comprised of at least two different frequencies, each different frequency being modulated by a different modulating waveform. Where Pseudo-Random codes are utilized as the modulating waveforms, they are generated in such a way that the periods of each of the codes is different. In that way, the zero Doppler peaks on the "ambiguity surface" will occur at slightly different times, but the ambiguities resulting from both modulated frequency signals will come back in phase at a later time. The receiver separates the return radar signal into the components due to each frequency in the transmitted signal and after suitable signal processing indicates the presence of a target only upon the simultaneous occurrence of main Doppler peaks due to the different return radar signal frequencies. This can occur only at the time when the ambiguities of each of the frequency signals are in phase.

STATEMENT OF THE OBJECTS OF THE INVENTION

It is the primary object of the present invention to disclose a novel radar system.

It is another object of the present invention to disclose a radar method and apparatus that provides velocity discrimination, target radial velocity, and large unambiguous ranging capability.

Other objects, advantages and novel features of the invention will become apparent from the following detailed description of the invention when considered in conjunction with the accompanying drawings.

DESCRIPTION OF THE PREFERRED EMBODIMENT

Figure 1:
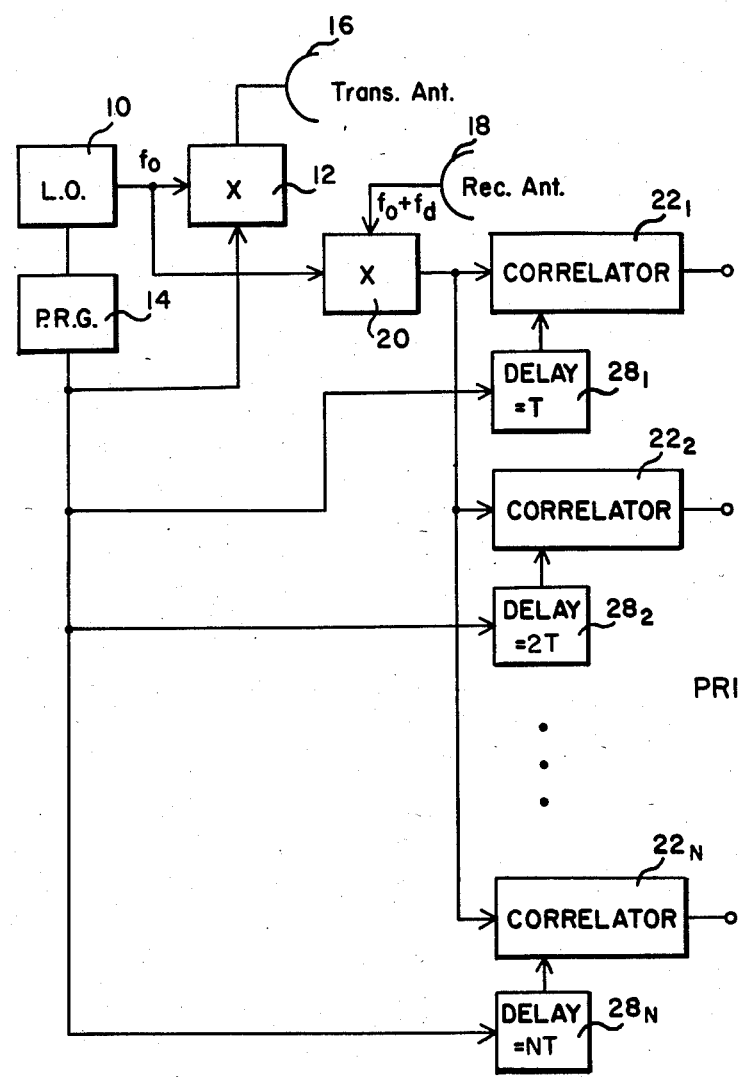
FIG. 1 is a network diagram of a prior art radar system.

To facilitate an understanding of the present invention, a brief description of a related prior art radar system illustrated in FIG. 1 will be described. In the prior art system a local oscillator 10 at the transmitter produces a sinusoidal radar signal at a frequency $f_o$ which is phase-reverse modulated by multiplier 12 in accordance with a repeating Pseudo-Random binary sequence generated by Pseudo-Random generator 14. If N is denoted as the number of bits in the Pseudo-Random sequence and T is the bit time, then the period of the modulating code is NT. Also, the autocorrelation function of the modulating code is periodic with the period NT. The phase reverse modulated signal is, of course, transmitted by some suitable transmitting antenna 16.

A stored reference correlation receiver is used. The receiver antenna 18 receives the reflected or return radar signal which has a frequency $f_o + f_d$ where $f_d$ is the Doppler frequency shift due to any radial velocity of the target. For purposes of this description $f_d$ will be considered positive if the target is moving towards the radar site and negative if it is moving away from the radar site. The return radar signal is then heterodyned by heterodyner 20 with the output of local oscillator 10. The output of heterodyner 20 is provided as the input to each one of the correlators $22_1, 22_2, \ldots 22_N$. The output of code generator 14 is connected to each of the delay networks $28_1, 28_2, \ldots 28_N$, the delays being integral multiples of T, T being previously defined as the bit time in the code sequence.

The maximum Doppler frequency shift from the target is $$f_d = 2/C \, v f_o \tag{1}$$

where $f_o$ equals the transmitted carrier frequency, v equals the maximum target radial velocity and C equals the speed of light. In the system illustrated in FIG. 1 it is assumed that the correlators pass frequencies less than or equal to $f_d$. A portion of the "ambiguity surface" of the output of the system of FIG. 1 is shown in FIG. 2, where $\rho$ equals the time delay between the delayed reference code and the received code and wherein it is seen that at $\rho = NT$, the first ambiguous Doppler peak appears. The ambiguity is caused by the inability of the receiver to discern which recursion of the modulated transmitter signal has been reflected by the target. To prevent degradation of the correlation output due to the Doppler frequency shift, as is common practice, the constraint is imposed that:

$$|f_d| \leq 1/4NT \tag{2}$$

where $|f_d|$ denotes the magnitude of $f_d$. The unambiguous range of the system is then $$R = NT \, C/2. \tag{3}$$

From (2) the maximum code period NT is given by $$NT \leq 1/4|f_d|. \tag{4}$$

From equations (3) and (4), the maximum unambiguous range as a function of the maximum Doppler frequency shift is given by $$R = C/8|f_d|. \tag{5}$$

Figure 2:
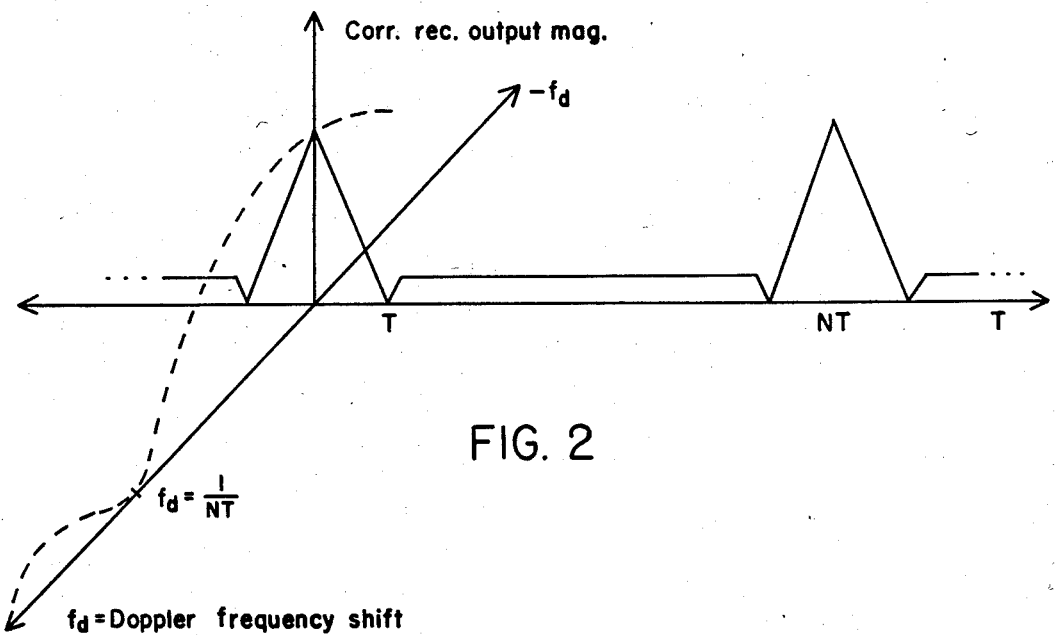
FIG. 2 is a graph of the "ambiguity surface" of the prior art radar system.

Hence, the maximum unambiguous range of the radar system shown in FIG. 1 is inversely proportional to the maximum Doppler frequency shift caused by target motion. The range resolution of this radar system is CT/2.

Some advantages of this radar system are that it produces an output frequency proportional to the target radial velocity and can provide discrimination against low velocity reflectors such as sea clutter by suitable modification of the passband of the low pass filter section of the correlator. Use of a high carrier frequency also has the advantage that small antenna beam widths are obtained with relatively small antenna dimensions. As described in the equations above, however, and as illustrated in the ambiguity surface of FIG. 2, this prior art system has a limited maximum unambiguous range.

Figure 3:
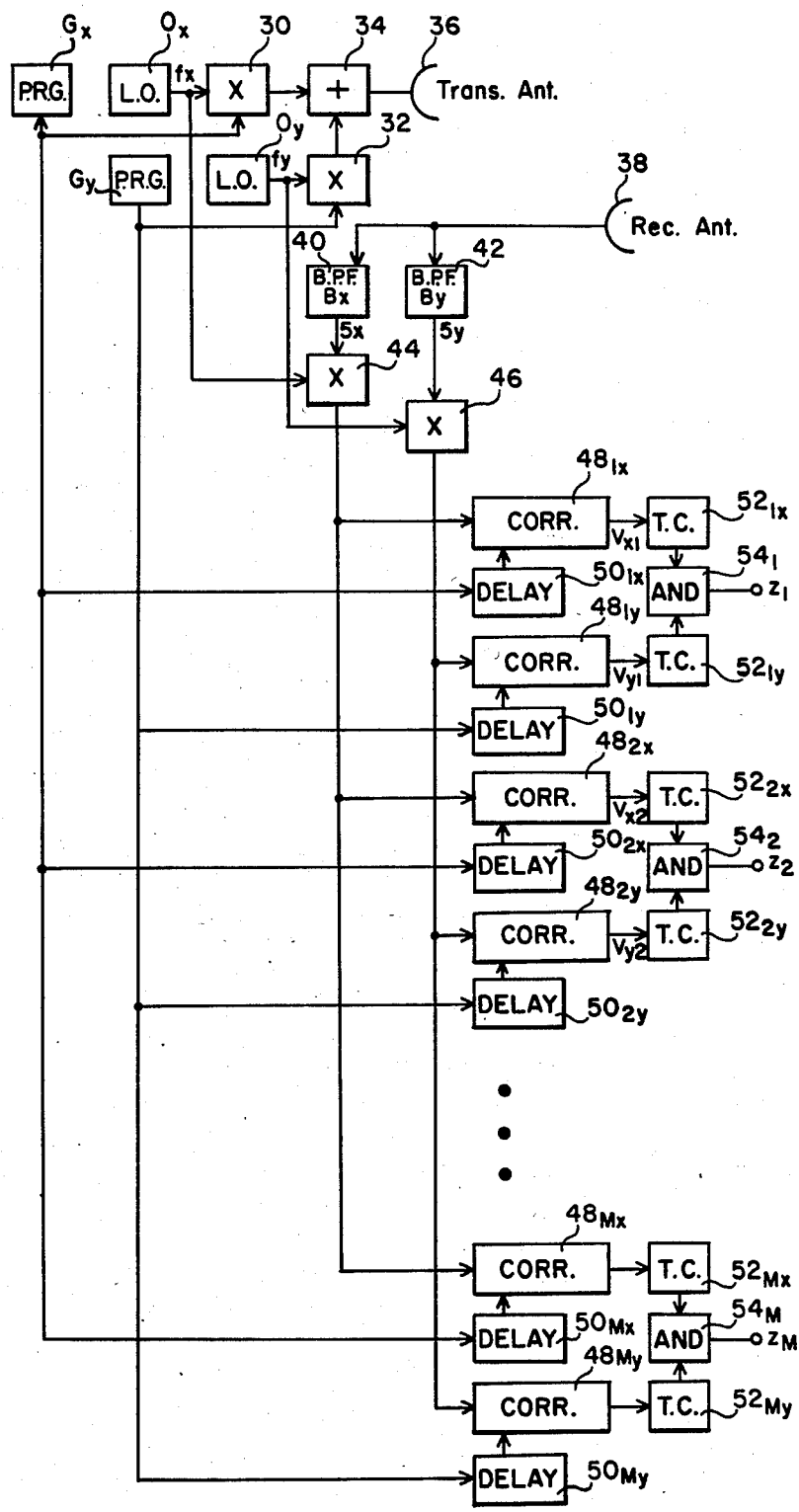
FIG. 3 is a network diagram of the radar system of the present invention.

The present invention, illustrated in FIG. 3, not only provides velocity information and velocity discrimination but also provides a large unambiguous ranging capability for targets which produce even relatively large Doppler frequency shifts. Although the specific embodiment illustrated in FIG. 3 utilizes two local oscillators and two Pseudo-Random generators, it is to be understood that it is within the scope of this invention that the radar system could include any desired number of local oscillators and corresponding code generators depending upon the desired extension of the unambiguous ranging capability. The basic approach of the present invention is to use at least two local oscillators operating at different frequencies and each modulated by a periodic Pseudo-Random sequence having a different period NT where N is the number of bits in the sequence and T is the bit time.

Referring specifically now to FIG. 3 a first local oscillator $O_X$ produces a sinusoid of frequency $f_x$. A second local oscillator $O_y$ produces another sinusoid of frequency $f_y$ where $f_y$ is greater than $f_x$. Pseudo-Random generator $G_x$ produces a repeating Pseudo-Random sequence of period $P_x = N_x T_x$ where $N_x$ is the number of bits in the sequence and $T_x$ is the bit time. The Pseudo-Random generator $G_y$ produces a repeating Pseudo-Random sequence of period $P_y = N_y T_y$ where $N_y$ is the number of bits in the sequence and $T_y$ is the bit time. It is a specific requirement of this invention that the period of the $G_x$ code does not equal the period of the $G_y$ code, i.e., $N_x T_x \neq N_y T_y$. After modulation of the local oscillator $O_x$ sinusoid $f_x$ with the code sequence produced by generator $G_x$ by multiplexer 30 and modulation of the local oscillator $O_y$ sinusoid $f_y$ with the code produced by generator $G_y$ by multiplier 32, the two phase-reverse modulated sinusoids are added by adder 34 and transmitted by a suitable antenna 36. In order that the different local oscillator frequencies be separable in the receiver the restriction is made that $$f_y - f_x > 1/T_y + 1/T_x \tag{6a}$$

or $$f_y - f_x > 2/T \text{ for } T_x = T_y = T. \tag{6b}$$

The receiver receives the return radar signal at receiver antenna 38 and separates the two signals by means of frequency filters 40 and 42 which are preferably bandpass filters so designed that the passbands of the filters do not overlap. $S_x$ and $S_y$ are the signals at the outputs of 40 and 42, respectively. Both signals $S_x$ and $S_y$ are heterodyned with the local oscillator signals $f_x$ and $f_y$, respectively, by heterodyners 44 and 46 to bring the signals back to baseband as is well known in the art. The heterodyned signals are then routed to the respective correlators $48_{1x}$, $48_{1y}$, $48_{2x}$, $48_{2y}$, ... $48_{Mx}$ and $48_{My}$ as is illustrated in the drawings. The value of M will be derived below.

Each of the correlators 48 correlates the heterodyned signals with the appropriate reference codes from generators $G_x$ and $G_y$. Each correlator uses reference codes which have different time delays $D_i$ where $D_i = iT$ and $i = 1, 2, \ldots M$. These delays are introduced by delay circuits $50_{1x}$, $50_{1y}$, $50_{2x}$, $50_{2y}$, ... $50_{Mx}$, and $50_{My}$ of well known design. As stated above, one of the system restrictions is that $N_x T_x \neq N_y T_y$. For purposes of simplicity it is assumed that $T_x = T_y$ and, therefore, that $N_x \neq N_y$. Under this assumption the delay introduced by delay circuit $50_{1x}$ would equal the delay introduced by delay circuit $50_{1y}$ and both would equal T. Likewise, the delay introduced by delay circuits $50_{2x}$ and $50_{2y}$ would equal 2T. Similarly, the delays introduced by delay circuits $50_{Mx}$ and $50_{My}$ would equal MT.

The outputs of each of the correlators 48 is then fed to a corresponding threshold circuit 52, the threshold circuits being denoted $52_{1x}$, $52_{1y}$, $52_{2x}$, $52_{2y}$, ... $52_{Mx}$, and $52_{My}$. The threshold level of each threshold circuit depends on the number of bits in the Pseudo-Random generator code to which the threshold circuit is connected, i.e., for the x channel the threshold level should be less than a value proportional to $N_x$, the number of bits in the x code and for the y channel it should be less than a value proportional to $N_y$, the number of bits in the y channel and both must be greater than the respective sidelobe values.

According to the present invention, a target is recognized only when a main Doppler peak produced in the x channel is exactly in phase with a main Doppler peak produced in the y channel, thus increasing the unambiguous range of the system. The term main Doppler peak as used herein includes not only the peaks appearing when the Doppler frequency shift is zero but also the peaks as degraded by a non-zero Doppler frequency shift as illustrated by the dotted lines in FIGS. 2 and 4. This of course occurs when $\tau = 0$, $P_x$, $-P_x$, $2P_x$, $-2P_x$, etc. for the x channel correlator and when $\tau = 0$, $P_y$, $-P_y$, $2P_y$, $-2P_y$, etc. for the y channel correlator.

Figure 4:
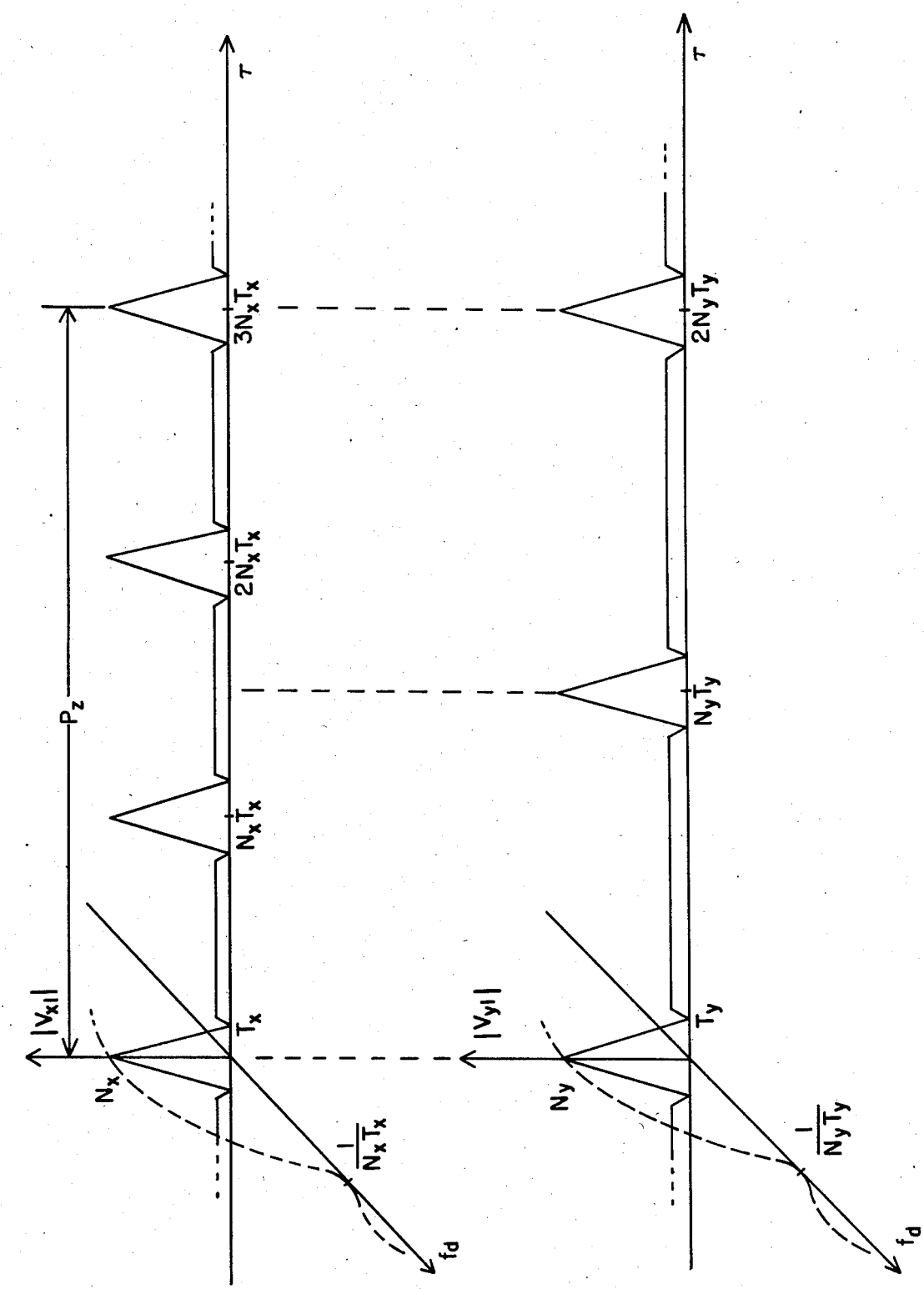
FIG. 4 is a graphical illustration of the "ambiguity surface" of the dual system of the present invention.

$V_{x1}$ is the correlation output for signal $S_x$ and $V_{y1}$ is the correlation output for signal $S_y$. A portion of the ambiguity surface for the magnitude of $V_{x1}$ and $V_{y1}$ is illustrated in FIG. 4. From FIG. 4 it can also be seen that, in this particular example, the number of bits in the y code is greater than the number of bits in the x code. The time $P_z$ when the Doppler peaks come back in phase is also illustrated in FIG. 4. To prevent overlap of these correlation peaks and to assure that a peak of the x channel and a peak of the y channel will eventually align exactly, the following constraints must be imposed on the system. Assuming that $P_x = N_x T$ and $P_y = N_y T$ where $N_x$ and $N_y$ are integers and $N_y$ is greater than $N_x$ then $P_y - P_x$ must be greater than or equal to $2T$ and $P_y - P_x$ must be less than or equal to $P_x - 2T$. Furthermore, $P_y - P_x$ must equal $P_x/K$ where K equals 2, 3, 4, ....

Hence, for $P_x = N_x T$ and $P_y = N_y T$ the following restrictions must be satisfied:

$$N_y \geq N_x + 2 \quad (7)$$

$$N_y \leq 2(N_x - 1) \quad (8)$$

$$N_y = N_x(1 + 1/K), K = 2, 3, 4, \ldots \quad (9)$$

For example, if $N_x = 4$ then $N_y = 6$ or if $N_x = 16$, for example, then $N_y = 18, 20,$ or $24$. As a further example, if $N_x = 256$ then $N_y = 258, 260, 264, 272, 288,$ or $384$. The period $P_z$ when the main Doppler peaks return in phase is $$P_z = K P_y = P_x P_y / P_y - P_x = N_x N_y T / N_y - N_x \quad (10)$$

If $$M = N_x N_y / N_y - N_x \quad (11)$$

then $$P_z = MT \quad (12)$$

The foregoing equations indicate that the system should be designed with M delay channels.

AND gates $54_1, 54_2, \ldots 54_M$ are connected as illustrated in FIG. 3 to the corresponding threshold circuits 52 whereby a target is recognized only upon the simultaneous output of a pair of threshold circuits $52_{1x}$ and $52_{1y}$ or $52_{2x}$ and $52_{2y}$, etc. On the occurrence, therefore, of an exact phase alignment between an x channel main Doppler peak and a y channel main Doppler peak, the AND circuit 54 in one of the delay channels will energize its corresponding output z.

The unambiguous range of the radar system is $$R = C P_z / 2 = C M T / 2 = C T N_x N_y / 2 (N_y - N_x). \quad (13)$$

The range resolution of the radar system of the present invention is $CT/2$.

The approximate relation between the unambiguous range of the present system and the maximum Doppler frequency shift $|f_d|$ is now considered.

If the restriction (14) is used, $$|f_d| N_y T \leq \tfrac{1}{4}, N_y > N_x \quad (14)$$

then $$T \leq 1/4 |f_d| N_y. \quad (15)$$

From (13) and (15), the maximum unambiguous range of the new system is $$R = \frac{CM}{8|f_d|N_y} = \frac{C}{8|f_d|\left(\dfrac{N_y}{N_x} - 1\right)}. \quad (16)$$

From (9) and (16), $$R = CK/8|f_d| \quad (17)$$

where $$K = \frac{1}{\dfrac{N_y}{N_x} - 1}. \quad (18)$$

For example, if $N_x = 256$ and $N_y = 384$ then $M = (2)(384) = 768$ and $K = 2$ and the maximum unambiguous range is $R = 2C/8|f_d|$. As a further example, if $N_x = 256$ and $N_y 258$ then $M - (128)(258) = 33024$ and $K = 128$ and the maximum unambiguous range is $R = 128C/8|f_d|$.

The unambiguous range of the system of the present invention is thus seen to be K times greater than the unambiguous range of the prior art system when the two systems are compared on the basis of equal range resolutions and equal Doppler frequency shifts.

Thus a novel radar system has been disclosed which provides velocity discrimination, target radial velocity, and a large unambiguous ranging capability.

Obviously many modifications and variations of the present invention are possible in the light of the above teachings. It is therefore to be understood that it is within the scope of the appended claims that the invention may be practiced otherwise than as specifically described.

What is claimed is:

1. A radar system comprising:
   a radar signal transmitting means for outputting a radar signal having first and second signal components comprising first and second frequency generating means for producing, respectively, a first frequency generator signal at a first predetermined frequency and a second frequency generator signal at a second predetermined frequency different from said first predetermined frequency;
   said radar signal transmitting means further comprising a first Pseudo-Random generator means for generating a first Pseudo-Random sequence for modulating said first frequency generator signal and a second Pseudo-Random generator means for generating a second Pseudo-Random sequence for modulating said second frequency generator signal, the period of said first Pseudo-Random sequence being different from the period of said second Pseudo-Random sequence, whereby the modulated first frequency generator signal comprises said first signal component and the modulated second frequency signal comprises said second signal component; and
   a radar return signal receiving means for receiving a return radar signal and for providing an output only upon the simultaneous presence of a main Doppler peak resulting from said first signal component and a main Doppler peak resulting from said second signal component.

2. The system of claim 1 including:
   a first multiplier connected to said first frequency generating means and to said first Pseudo-Random generator means; and
   a second multiplier connected to said second frequency generating means and to said second Pseudo-Random generator means.

3. The system of claim 2 including an adder connected to said first and second multipliers whereby the output of said adder is said radar signal.

4. The system of claim 1 wherein said radar return signal receiving means includes:

a first filter for passing a band of frequencies centered at the carrier frequency of said first signal component; and a second filter for passing a band of frequencies centered at the carrier frequency of said second signal component.

5. The system of claim 4 wherein there is no overlap between the passbands of said first and second filters.

6. The system of claim 4 further including:

a first and second heterodyner connected to said first and second filters respectively and to said radar signal transmitting means;

a first plurality of correlators connected to said first heterodyner; and a second plurality of correlators connected to said second heterodyner.

7. The system of claim 6 further including:

a first plurality of threshold circuits each connected to a different one of said first plurality of correlators;

a second plurality of threshold circuits each connected to a different one of said second plurality of correlators; and a plurality of AND circuits each connected between one of said first plurality of threshold circuits and one of said second plurality of threshold circuits.

8. The system of claim 7 further including:

a plurality of delay devices connected to said radar signal transmitting means and each of said plurality of delay devices being connected to a different one of said first and second plurality of correlators.

9. The system of claim 3 wherein said radar return signal receiving means includes:

a first filter for passing a band of frequencies centered at the carrier frequency of said first signal component; and a second filter for passing a band of frequencies centered at the carrier frequency of said second signal component.

10. The system of claim 9 wherein there is no overlap between the passbands of said first and second filters.

11. The system of claim 10 further including:

a first and a second heterodyner connected to said first and second multipliers respectively and to said radar signal transmitting means;

a first plurality of correlators connected to said first heterodyner; and a second plurality of correlators connected to said second heterodyner.

12. The system of claim 11 wherein said first heterodyner is connected to the output of said first frequency generating means and said second heterodyner is connected to the output of said second frequency generating means.

13. The system of claim 12 further including:

a first plurality of threshold circuits each connected to a different one of said first plurality of correlators;

a second plurality of threshold circuits each connected to a different one of said second plurality of correlators; and a plurality of AND circuits each connected between one of said first plurality of threshold circuits and one of said second plurality of threshold circuits.

14. The system of claim 13 further including:

a first plurality of delay devices each connected to said first Pseudo-Random generator means and to a different one of said first plurality of correlators; and a second plurality of delay devices each connected to said second Pseudo-Random generator means and to a different one of said second plurality of correlators.

15. A method of radar detection comprising the steps of:

generating and transmitting a radar signal comprised of a first frequency component modulated by a first modulating waveform and a second frequency component different from said first frequency component and modulated by a second modulating waveform having a waveform period different from the waveform period of said first modulating waveform;

receiving a return radar signal;

filtering said return radar signal to separate that portion of the return radar signal due to said first frequency component from that portion of the return radar signal due to said second frequency component;

providing a first plurality of different delays to said first modulating waveform to create a first plurality of delayed modulating waveforms;

providing a second plurality of different delays to said second modulating waveform to create a second plurality of delayed modulating waveforms;

correlating each of said first plurality of delayed modulating waveforms with that portion of the return radar signal due to said first frequency component to provide a first plurality of correlator outputs;

correlating each of said second plurality of delayed modulating waveforms with that portion of the return radar signal due to said second frequency component to provide a second plurality of correlation outputs; and providing a system output only when one of said first plurality of correlation outputs and a corresponding one of said second plurality of correlation outputs simultaneously exceed a predetermined value.

* * * * *